United States Patent [19]

Trocino et al.

[11] Patent Number: 5,162,394

[45] Date of Patent: Nov. 10, 1992

[54] FIRE-RETARDANT CHEMICAL COMPOSITIONS

[75] Inventors: Frank S. Trocino, Bellingham; Fred J. Amundson, Blaine, both of Wash.

[73] Assignee: 501 Chemco Inc., Ferndale, Wash.

[21] Appl. No.: 584,285

[22] Filed: Sep. 18, 1990

[51] Int. Cl.$^5$ .............................................. C08K 9/00
[52] U.S. Cl. ................... 523/208; 523/179; 524/47; 524/49; 524/58; 524/503
[58] Field of Search .............. 524/47, 49, 58, 503; 523/179, 208

[56] References Cited

U.S. PATENT DOCUMENTS

| | | | |
|---|---|---|---|
| 2,881,088 | 4/1959 | Schulenburg | 117/33 |
| 3,562,197 | 2/1971 | Sears et al. | 260/28.5 |
| 4,129,693 | 12/1978 | Cenker et al. | 521/106 |
| 4,216,261 | 8/1980 | Dias | 428/264 |
| 4,265,963 | 5/1981 | Matalon | 428/411.1 |
| 4,505,849 | 3/1985 | Staendeke et al. | 252/609 |
| 4,639,331 | 1/1987 | Elsner et al. | 252/609 |
| 4,670,484 | 6/1987 | Fuchs | 523/205 |
| 4,698,369 | 10/1987 | Bell | 521/99 |
| 4,701,373 | 10/1987 | Fuchs et al. | 428/326 |
| 4,772,642 | 9/1988 | Staendeke | 523/205 |
| 4,774,268 | 9/1988 | Marx et al. | 523/179 |

FOREIGN PATENT DOCUMENTS

| | | |
|---|---|---|
| 51-125440 | 11/1976 | Japan . |
| 63-176102 | 7/1988 | Japan . |
| WO85/05626 | 12/1985 | PCT Int'l Appl. . |

Primary Examiner—Kriellion S. Morgan
Assistant Examiner—U. K. Ranguru
Attorney, Agent, or Firm—Klarquist, Sparkman, Campbell, Leigh & Whinston

[57] ABSTRACT

A fire-retardant composition for rendering a combustible hydrophilic substrate resistant to combustion and flaming is disclosed. Also disclosed are processes employing said composition for rendering a hydrophilic substrate resistant to combustion, as well as structural material made fire-resistant by such a process. The composition is a thermoset formed by combining two resins, which can be either made and stored separately for long periods until use or stored as a partially polymerized liquid mixture. The resins are water soluble and heat-curable to form the thermoset. The first resin comprises polyols derived preferably from a carbohydrate such as maltodextrin having substituent groups occupying a portion of the available hydroxyls derived from mono-ammonium phosphate, urea, phosphoric acid, and glyoxal. The second resin can be a methylol-melamine-formaldehyde, methylol-urea-formaldehyde, or methylol-phenol-formaldehyde formulation. When cured on a hydrophilic substrate, the fire-retardant composition becomes crosslinked and covalently bonded to molecules of the substrate. Also, P- and N-containing constituents critical for fire retardancy are covalently bound in the thermoset, rendering these constituents non-leachable. As a result, fire-retardancy is maintained throughout the useful life of the substrate, even when exposed to the weather.

21 Claims, No Drawings

FIRE-RETARDANT CHEMICAL COMPOSITIONS

FIELD OF THE INVENTION

This invention relates to fire retardants, especially fire-retardant chemicals applied to cellulosic and other hydrophilic substrates for the purpose of decreasing the combustibility or flammability of such substrates.

BACKGROUND OF THE INVENTION

Many of the most useful materials for building and other industrial uses are flammable. This is particularly true of cellulosic materials, such as wood and wood products, paper and cardboard, and textiles from natural plant fibers. Many synthetic materials, such as plastics are also flammable, some highly so. Since these materials have properties that are difficult to duplicate using non-flammable substitutes, much research has focused on how to make these materials less flammable.

Cellulose, such as in wood and paper, is a polysaccharide that burns by a complex oxidative mechanism when subjected to a temperature above about 140° C. The cascading sequence of oxidative reactions includes cleavage of the polysaccharide into its constituent monomers (glucose and glucose derivatives) and oxidative splittings of the glucose rings of the monomers. For example, an intermediate reaction product is levoglucosan which oxidizes further to volatile, flammable compounds and char. The char is believed to be comprised mainly of carbon together with mineral residues. Oxidative cleavages of the chemical bonds comprising the cellulose molecules release large amounts of chemical energy, chiefly in the form of heat and light. The heat produced is also a major factor that perpetuates the cascading progression of oxidative reactions until all the cellulose fuel is ultimately consumed.

Certain phosphorus compounds are very effective as fire retardants for flammable carboniferous substrates apparently because, upon even mild heating, they generate acid residues, such as phosphorous acid, having a high boiling point. These acids react with hot substrate molecules. Their oxidative by-products increase the formation of non-volatile forms of carbon, such as char, from the substrate material, with correspondingly reduced formation of flammable volatiles. As a result, weight reduction of the substrate upon exposure to a burning environment is much reduced.

Although the chemistry of flame retardation and char formation by phosphorus compounds is not entirely clear, a probable mechanism is the increased formation of carbonium ions from the hot substrate due to reaction with phosphorus-containing acids, with attendant aldol-type condensation reactions of the substrate molecules, yielding olefins. The ultimate result is that heat generation is slowed remarkably. Another postulated mechanism is the appreciable reduction or elimination of "afterglow" by blocking the diffusion of oxygen to the hot surface of the substrate.

Certain phosphorus compounds are still recognized as some of the best fire retardants known, especially for cellulosic and many synthetic polymeric substrates. The historically most useful fire-retardant phosphorus compounds include phosphoric acid ($H_3PO_4$), monoammonium phosphate ($NH_4H_2PO_4$), diammonium phosphate (($NH_4)_2HPO_4$), and ammonium polyphosphate (($NH_4PO_3)_x$). Other useful phosphorus compounds include guanidine phosphate, guanylurea phosphate, phosphorylamides, and phosphonitrilic compounds.

Generally, a phosphorus content of about 3% or more is effective to impart significant fire-retardancy to cellulosic substrates. Phosphorus seems to be more effective at lower levels than any other fire-retardant element used alone, such as chlorine, bromine, boron, and antimony.

Certain nitrogen compounds, while not generally conferring significant fire retardancy when used alone, seem to participate synergistically with phosphorus in conferring a fire-retardant effect that is greater than the sum of their separate effects. Adding nitrogen often allows the amount of phosphorus in the fire retardant to be decreased. However, more nitrogen is usually needed than the amount of phosphorus omitted to achieve the same result. For example, to impart fire retardancy to wood using monoammonium phosphate, urea is often added to the phosphate solution, where about four to ten parts of urea are added per part of monoammonium phosphate.

Many of the early uses of phosphorus compounds involved the preparation of an aqueous solution of an orthophosphate salt, such as monoammonium or diammonium phosphate, and the application of the solution to, for example, a cellulosic surface such as wood, or the immersion of a substrate material, such as cotton (cellulose fibers) cloth in the solution. The solution is allowed to dry on the material, leaving behind crystals of the phosphate salt on the surface. The main problem with this approach is that the phosphate salt is water soluble. Any subsequent wetting of the treated substrate material causes leaching of the salt, thereby washing away the fire retardancy. Humid environments can also cause leaching.

Another problem with the above approach is that drying of the solution on the substrate sometimes needs to be accelerated by the application of heat. Heat can cause phosphate salts, such as diammonium phosphate, to liberate ammonia, which reduces the fire retardancy of the salt because, as discussed above, ammonia serves as a synergistic nitrogen-containing compound.

Another problem with the above approach is that free phosphate salts are dissociable into ions that can cause structural deterioration of the cellulose. Although such dissociation occurs rapidly in wet conditions, it will also occur on a "dry" surface, which normally has one or more layers of water molecules thereon that originated from the atmosphere. A cellulosic substrate derives a significant portion of its structural integrity by hydrogen bonding between adjacent cellulose molecules. These hydrogen bonds can be disrupted by the incursion of ions (electrostatically charged atomic or molecular species) between the atoms participating in the bonds, which interrupts the bonding interactions between the atoms and ultimately causes the cellulose molecules to separate from one another. Such damage allows penetration of water into and general destruction of the substrate.

Free phosphate salts and low molecular-weight acids, such as phosphoric acid, can also cause delignification of wood by reacting with and cleaving lignins that bind wood fibers together and by cleavage of the cellulose molecules comprising the wood. Such cleavage can ultimately result in a potentially severe loss of structural strength of the wood, especially over a prolonged period of time.

A number of researchers have attempted to solve the problem of phosphate leaching by using fire retardants comprising polymerized forms of phosphate, such as ammonium polyphosphate, which has a variable molecular-weight ranging in the thousands to millions. Such a high molecular-weight is resistant to dissolution and leaching. Unfortunately, ammonium polyphosphate is a solid, crystalline material which is substantially insoluble both in water and in most organic solvents. As a result, to permit application of ammonium polyphosphate to a substrate, the compound must be finely ground into a powder and dispersed in a carrier matrix such as a synthetic polymer, adhesive, or mastic.

One problem with fire-retardant compositions containing ammonium polyphosphate is that, as an insoluble granular compound, ammonium phosphate cannot penetrate into and bond with the substrate. Further, ammonium polyphosphate grains suspended in a carrier can be less effective than a solution of a phosphorus-containing compound in the carrier for ensuring that phosphorus is present throughout the carrier where it is needed to form flame-resistant compounds during combustion. Another problem is the fact that many carriers comprising an organic resin are hydrophobic. As a result, they either covalently bond poorly or not at all to a hydrophilic substrate, such as cellulose, and are consequently vulnerable to peeling and the like, which ultimately results in loss of fire retardancy. Another problem is that the granules of ammonium polyphosphate must usually be individually coated with a layer of synthetic polymer in order to facilitate free-flowing of the granules or to make the material dispersable in a carrier resin. Examples are disclosed in U.S. Pat. Nos. 4,772,642 to Staendeke, 4,701,373 to Fuchs and Staendeke, 4,670,484 to Fuchs and Staendeke, and 4,639,331 to Elsner et al. Nevertheless, ammonium polyphosphate has been particularly useful when dispersed in a resin for making, for example, flame-resistant polyurethane foam, such as disclosed in U.S. Pat. Nos. 4,505,849 to Dany et al. and 4,129,693 to Cenker and Kan. Ammonium polyphosphate is also useful when dispersed in an adhesive used, for example, in the manufacture of flame-resistant chip boards and plywood, such as disclosed in U.S. Pat. No. 4,701,373 to Fuchs and Staendeke.

Other researchers have addressed the phosphate leaching problem by mixing phosphate salts in a polymer resin and applying the mixture to the surface of a substrate. Problems with this approach include the insolubility of the salts in many resins and the persistent tendency of either the non-covalently bound salts or their corresponding ions to leach from the cured resin. Also, free ions of the salts in the polymer are able to penetrate and disrupt the hydrogen bonding between cellulose molecules and cause delignification and cleavage of cellulose molecules, thereby eventually deteriorating the substrate. Further, such resin mixtures are usually poorly soluble in water and other hydrophilic solvents, which can prevent the composition from adhering well to hydrophilic surfaces such as cellulose. Consequently, the applied resin does not withstand the effects of weather and other adverse environmental forces over the useful lifetime of the substrate, resulting in loss of fire-retardancy before expiration of the useful life.

Sometimes, polyols are added to fire-retardant compositions to facilitate a desired polymerization reaction of the composition or to improve flame-retardancy. A polyol is a chemical compound comprising plural hydroxyl moieties. Examples of polyols include sugars, such as glucose, maltose, and arabinose; polyhydric alcohols, such as erythritol, sorbitol, and inositol; polysaccharides, such as starches and dextrins; and synthetic polymers, such as polyvinylalcohol. If the polyol has one or more ring structures, such as trimellitic acid moieties, the polyol may be added to the composition because the rings form flame-resistant crosslinked residues upon combustion. Also, certain polymers, such as polyurethanes, can be formed via reaction of a polyol with, for example, a diisocyanate.

Another reason why polyols have been added to certain flame-retardant formulations is because polyols can facilitate intumescence. Intumescence is the production, upon heating, of a surficial puffy char residue comprised mostly of carbon. The char serves as an insulating layer protecting the underlying substrate from flames. A number of flame-retardant paints, coatings, and mastics are intumescent. An early example is U.S. Pat. No. 2,881,088 to Schulenburg.

A number of current polymeric flame-retardant compositions are thermoplastic upon curing. A "thermoplastic" is comprised of polymer molecules that are either non-crosslinked or are very poorly crosslinked. As a result, even though such a material may feel "solid" at, say, room temperature, heating the material causes softening and eventual melting to a liquid state. Upon cooling, the material returns to a "solid" form. Thermoplastics also tend to be soluble in certain solvents. As a result, thermoplastic compositions can lose their effectiveness in a fire due to their tendency to flow or drip off the substrate upon heating. Also, once the composition melts, or begins to boil in a fire, production of flammable volatiles becomes more likely, which defeats the original purpose of the composition.

The problems discussed above with existing fire-retardant chemicals are particularly acute when such chemicals are applied to cellulosic substrates exposed to weather. For example, shakes and shingles for roofs are often produced from a softwood, such as cedar, which is easily ignited, particularly when dry. Also, building roofs are exposed to one of the most aggressive environments known. This environment includes all the vicissitudes of the weather, including extremes of temperature, sunlight, precipitation, biological growth, and mechanical wear. No fire-retardant compositions are known in the art that will keep substrates, such as wooden shakes and shingles, fire retardant over their useful life. It would be advantageous if such wooden members could be chemically treated to render them fire-resistant, where the fire retardancy would be able to withstand continuous exposure to weather over the useful life of the wooden member.

Hence, there is a need for a fire-retardant formulation particularly suited for and applied as a hydrophilic liquid to cellulosic and other hydrophilic substrates, where the formulation comprises a phosphorus ingredient that becomes non-leachable upon curing the formulation after application to the substrate.

There is also a need for such a fire retardant where the phosphorus-containing ingredient is dissolved in the liquid formulation, rather than suspended in the form of dispersed grains in the liquid formulation.

There is also a need for such a fire-retardant formulation that is substantially water-soluble at the time it is applied as a liquid to the substrate to ensure thorough wetting and penetration of interstices of the substrate and correspondingly superior bonding of the composition to the substrate after curing.

There is also a need for such a composition that chemically reacts with hydrophilic substrate molecules to effect strong covalent bonding of the composition to the substrate molecules and consequent resistance of the composition after curing to effects of weather and other environmental forces.

There is also a need for such a composition that can be applied as a liquid, that cures to a solid, and that has a long shelf life as a liquid before time of use.

SUMMARY OF THE INVENTION

The present invention comprises a fire-retardant composition for rendering a combustible hydrophilic substrate material resistant to combustion and flaming. The present invention also includes a process employing the fire-retardant composition for rendering such a substrate resistant to combustion. The present invention also includes hydrophilic structural material rendered resistant to combustion by application of the fire-retardant composition.

As one feature of the present invention, the fire-retardant composition is a thermoset material formed by curing a liquid mixture of two resins. In a first embodiment of the fire-retardant composition, the two resins can be made separately and stored independently in a liquid state for prolonged periods. At time of use, the separate resins are combined, mixed together, applied to a combustible hydrophilic substrate, and cured to form the fire-retardant thermoset. In a second and preferred embodiment of the fire-retardant composition, both resins are combined, mixed together, and partially polymerized to form a storable single resin. At time of use, the single resin is applied to a combustible hydrophilic substrate and cured to form the fire-retardant thermoset.

All resins and mixtures thereof in either embodiment are water-soluble. After applying the resins to a substrate, curing is triggered by application of heat.

The first of the two resins, termed Resin A, is an aqueous solution of substituted polyol molecules. The polyol backbones preferably are derived from a carbohydrate such as maltodextrin, a polysaccharide having a large number of available hydroxyl groups per molecule. The substituent groups covalently bonded to the polyol molecules via phosphoester and other linkages, are derived from monoammonium phosphate, urea, phosphoric acid, and glyoxal which are added to an aqueous solution of the polyol. The substituent groups occupy a portion of the total number of available hydroxyls on each polyol molecule, leaving other hydroxyl groups on the polyols available to participate in reactions involving the second resin.

The second resin, termed Resin B, can have any of several possible formulations. A first and preferred formulation is a methylol-melamine-formaldehyde resin wherein the modified melamine solute serves as a curing (crosslinking) agent for Resin A. A second formulation is a methylol-urea-formaldehyde resin wherein the modified urea solute serves as a curing agent for Resin A. A third formulation is a methylol-phenol-formaldehyde resin which is stable at room temperature.

As another feature of the present invention, Resin A and Resin B can be combined into a single resin termed Resin C. Resin C is water soluble and stable at room temperature. Although Resin A and any of the Resin B formulations can be stored separately, especially for long periods, combining Resin A and a Resin B to form a Resin C is preferred due to the resulting savings in storage space.

As another feature of the present invention, the molecules of Resin B form covalent bridges between substituted polyol molecules of Resin A and between the substituted polyols and substrate molecules during curing. That is, either the methylol-melamine, the methylol-urea, or the methylol-phenol molecules of Resin B become covalently bonded both to remaining hydroxyl groups on the substituted polyol molecules of Resin A and to hydroxyl groups on substrate molecules. Such crosslinking with substrate molecules effects covalent bonding of the fire-retardant composition to the substrate upon curing. Since many combustible hydrophilic substrates such as cellulosics have plural available hydroxyl groups on the molecules thereof, the formulation of the present invention is particularly suitable for application to these substances.

As yet another feature of the present invention, the polyol in Resin A serves as a backbone to which the phosphorus- and nitrogen-containing constituents critical for fire retardancy are covalently bound, thereby rendering such constituents non-leachable. Also, the substituted polyols, by having leftover plural hydroxyls, supplies binding sites to which the crosslinking agent in Resin B covalently bonds the molecules of the resin mixture both together and with the substrate. Further, the polyols contribute to the tendency of the composition of the present invention to become intumescent in a flaming environment, which augments its fire retardancy.

As another feature of the present invention, the curing, or crosslinking, reactions are triggered by the application of heat after applying either the mixture of Resin A and Resin B or Resin C to a hydrophilic substrate. The temperature required to trigger curing of the mixture is about 50° C.

As yet another feature of the present invention, the thermoset fire-retardant composition of the copolymer formed using the methylol-melamine-formaldehyde formulation of Resin B has a substantial degree of crystallinity. All the thermosets disclosed herein are insoluble in both hydrophilic and hydrophobic solvents, and exhibit virtually no leaching of phosphorus, nitrogen, or other low molecular-weight compounds from the thermoset.

As yet another feature of the present invention, an uncured mixture of Resins A and B, as well as Resin C, are hydrophilic with an acid pH (about 2). These characteristics facilitate penetration of the uncured mixture into pores and other interstices of a hydrophilic substrate such as wood and other cellulosics. The low pH also facilitates the covalent bonding of the mixture to the substrate upon curing of the mixture. Such penetration can be further enhanced by subjecting the substrate to pressure after applying the uncured mixture or by applying the uncured mixture to the substrate under a subatmospheric pressure followed by application of pressure.

As yet another feature of the present invention, the fire-retardant composition is particularly useful for imparting fire-retardancy to construction lumber, including wooden shakes and shingles. The extensive covalent bonding of the composition to the substrate and absence of detectable leaching yields long-lasting fire-retardancy, even with wood exposed to the weather for periods as long as its useful life.

It is accordingly one object of the present invention to provide a phosphorus- and nitrogen-containing fire-retardant formulation that can be applied to combustible substrates and that leaches substantially no phosphorus or nitrogen after curing.

Another object of the present invention is to provide such a fire-retardant formulation that, when applied to a hydrophilic substrate, becomes covalently bonded to the substrate so as to render the formulation resistant to exfoliation and erosion from the substrate.

Another object of the present invention is to provide such a fire-retardant formulation that is hydrophilic so as to facilitate penetration into pores and other interstices of a hydrophilic substrate.

Another object of the present invention is to provide such a fire-retardant formulation that is curable to a thermoset and that requires an external "triggering" event to initiate the curing reaction.

Another object is to provide such a fire-retardant formulation that can be stored as a liquid for extended periods of time before time for use.

Another object is to provide such a fire-retardant formulation wherein the compounds containing phosphorus and nitrogen are covalently bonded to high molecular weight molecules that are crosslinked together with each other and with molecules of the substrate after curing so as to render such phosphorus- and nitrogen-containing compounds non-leachable, even during prolonged exposure to weather.

Another object is to provide such a fire-retardant formulation that can be readily applied to wooden and other cellulosic structural materials so as to render such materials resistant to combustion.

Another object is to provide such a fire-retardant formulation that, after application to the substrate and curing, is resistant to flow and dripping upon exposure to heat, including the heat of a flame.

Another object is to provide fire-retardant cellulosic structural materials from which the chemical entity conferring fire retardancy is substantially non-leachable over the useful lifetime of the structural materials.

Another object is to provide a process for imparting fire retardancy to a combustible substrate such as a structural cellulosic material, wherein the fire-retardant property is resistant to weather and mechanical wear.

Another object is to provide such a process to which a substrate such as a cellulosic structural material is subjected before the substrate is used in construction.

These and other objects, features, and advantages of the present invention will become apparent with reference to the following detailed description and examples.

DETAILED DESCRIPTION

The fire-retardant composition of the present invention is applied to an exterior surface in the form of a liquid prepared as a mixture of two resins, termed for convenience Resin A and Resin B. After application to the surface, the mixture of the two resins is cured to form a thermoset material. Resins A and B can be stored separately until time for use. Alternatively, Resins A and B can be combined and mixed together to form a Resin C which can be stored as a liquid until time for use.

As used herein, a "resin" is a liquid substance comprised of synthetic polymer molecules having the capacity to undergo further reaction (i.e., the capacity to "cure" into a rigid or solid material).

A "thermoset" material, in contrast to a thermoplastic, is comprised of polymer molecules that have been sufficiently crosslinked chemically to form a three-dimensional molecular network "solid" structure that is stable to heating and cannot be made to flow or melt. As a result, thermosets are usually more stable in a burning environment. Although a thermoset will decompose if it is heated too high, such excessive heating often results in char formation which can inhibit further thermal destruction of the material.

Resin A

Resin A is an aqueous solution of reactive polymer molecules. The resin is soluble in water and has an acid pH (about 2). Resin A is prepared by first dissolving in water a polyol, as well as monoammonium phosphate and urea. Then, phosphoric acid and glyoxal are added. In preparing Resin A, substantially all the phosphate, ammonia, urea, and glyoxal molecules become covalently bonded to a polymer backbone derived from the polyol. The resin remains a liquid, rather than becoming solid because the above ingredients, albeit covalently bonded to one another, are not extensively polymerized or crosslinked. Nevertheless, although the constituent compounds become polymerized, sufficient numbers of reactive groups remain present on the polymer molecules to participate in crosslinking reactions when Resin A and Resin B are combined and "triggered" to initiate a thermoset reaction.

Before proceeding to specific examples of amounts and concentrations of the ingredients comprising Resin A, the following is a discussion of the pertinent chemistry associated with the preparation of this resin.

First, an aqueous solution is prepared of the polyol, urea ($NH_2CONH_2$; CAS #57-13-6), and monoammonium phosphate ($NH_4H_2PO_4$; CAS #7722-37-3). Monoammonium phosphate and most polyols are soluble in water. Any of a number of water-soluble polyols such as various carbohydrates, starches, and polyvinylalcohol, may be used to prepare Resin A.

Maltodextrin (CAS #68131-37-3), or "amyloin", is the preferred polyol for use in Resin A. Maltodextrin is an intermediate length polysaccharide obtained, for example, from the action of the enzyme amylase on starch obtained from barley or other grain. Maltodextrin is comprised of the sugars dextrose (glucose) and maltose connected together mainly via $\alpha(1\rightarrow 4)$ linkages. The relative amounts of each sugar can vary, depending mainly on the particular origin of the starch. Each maltose, which is a disaccharide, has six available hydroxyl groups; each dextrose, which is a monosaccharide, has three available hydroxyl groups. As used herein, the term "available" means that the corresponding chemical group is free to participate in reactions, such as resulting in the attachment of other chemical moieties onto the corresponding chemical group or crosslinking reactions.

Monoammonium phosphate is a phosphate salt that, when added to water, dissociates into equimolar amounts of ammonium and orthophosphate ions. The salt is somewhat unstable as a pure solid or alone in aqueous solution, tending to release ammonia. For example, the solution produces a distinct ammonia odor in the atmosphere above the surface, even at room temperature. If the ammonia odor is not present above a solution comprising monoammonium phosphate, that is a good indication that the ammonia has become bonded to another compound in the solution.

Monoammonium phosphate and similar derivatives of phosphoric acid, when present in a solution containing polyols, participate in phosphoesterification reactions with hydroxyl groups present on the polyols. For example:

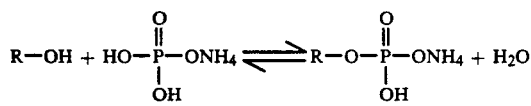

where R represents the remainder of the polyol. The above phosphoesterification reaction proceeds slowly and results in a polyol phosphate ester having relatively weak (easily hydrolyzable) ester linkages. However, if urea is also added to the solution, the reaction proceeds much more rapidly and smoothly to the right.

The role of urea in the above reaction is not fully understood. In a similar reaction involving diammonium phosphate performed under hot conditions (above about 110° C.), at least some of the urea is believed to serve as a dehydrating agent, where the urea is split and ammonia and carbon dioxide are liberated. Other urea molecules react at such temperatures with phosphoric acid to form urea phosphoric acid (carbamide phosphoric acid, $CO(NH_2)_2 \cdot H_3PO_4$) which reacts directly with hydroxyls on polyols. However, in the monoammonium phosphate reaction used to prepare Resin A, no liberation of ammonia or carbon dioxide is detected. This may be because the reaction is conducted at temperatures lower than 110° C. (see below) where urea splitting is disfavored. Since urea is a bifunctional molecule (having a reactive group on each end of the molecule—in this case, amine groups), the compound probably participates in condensation reactions with other hydroxyl groups on the polyol molecules and with remaining hydroxyl groups on the phosphates esterified to the polyols. Again, the evidence indicating that the urea is incorporated into a high molecular-weight compound is the substantial absence of ammonia in the atmosphere above the liquid solution and the non-production of gas bubbles that would indicate production of carbon dioxide. Further, the fact that urea seems to foster the production of phosphoesters that are less easily hydrolyzable than those formed in the absence of urea indicates that other bonding of the phosphorus is occurring in addition to the initial phosphoesterification to the polyol.

The amount of phosphorus that can be introduced to a polyol or other poly-hydroxyl compound via the above reaction seems to be self-limiting to a value below about 10%. Although the reason for this limit is unclear, steric hindrance effects probably play a significant role. This allows a large number of hydroxyl groups remaining on the polyol to remain available to participate in later reactions. Actually, only about 3% phosphorus is required in the overall composition to confer fire retardancy.

In performing the phosphoesterification reaction, the reactants are combined at room temperature (25° C.) or below and are slowly heated to about 105° C. while refluxing. The temperature is then held steady at about 105° C. for up to three hours with continued refluxing, then the temperature is slowly decreased to about 50° C. The period of elevated temperature is apparently required to ensure covalent bonding of substantially all the ammonium phosphate and urea to the polyol molecules.

The phosphoesterification reaction is performed under highly acidic conditions (pH less than 1), under which the reaction is much more favorable.

After the temperature has returned to about 50° C., phosphoric acid ($H_3PO_4$; CAS #7664-38-2) and glyoxal (HOC-COH; CAS #107-22-2) are added and the temperature held at about 50° C. for up to 24 hours during slow agitation of the liquid. The pH is maintained at a very low value (less than 1) during this second reaction.

Glyoxal is a dialdehyde that is very reactive at low pH. Being bifunctional, it is able to participate in condensation reactions with hydroxyl groups, whether bonded to polyols or to phosphorus atoms, resulting in the formation of ethyl-diester bridges either between polyol molecules or between hydroxyls located on the same polyol molecule. Glyoxal molecules also self-react via condensation reactions to form linear, branched, and ring-shaped polymers. Glyoxal is generally less reactive than formaldehyde in these condensation reactions, which helps to keep Resin A in a liquid state and extend the shelf life of the resin. Glyoxal is also reactive in condensation reactions with amine groups, which incorporates any remaining urea in Resin A into high molecular-weight molecules.

Another benefit of adding glyoxal to Resin A is that glyoxal enhances the water solubility of the resin. Improved water solubility is important for resins intended to be applied and covalently bonded to hydrophilic surfaces, such as a cellulosic material. When the resin is applied to a hydrophilic surface, the molecules of the resin make actual physical contact with the molecules of the cellulosic substrate. Such contact is important to facilitate covalent bonding of the resin polymer molecules with the substrate molecules, as discussed in further detail below.

The phosphoric acid added to Resin A participates in a number of reactions. First, the acid reacts directly with hydroxyl groups on the polyol in phosphoesterification reactions favorable at acid pH to bond the orthophosphate to the polyol. Second, the acid reacts in the presence of any remaining urea to phosphorylate other hydroxyl moieties, both on the polyol and on orthophosphate groups already attached to the polyol, further incorporating the orthophosphate groups via phosphoester linkages with the polymer molecules of Resin A.

Using phosphoric acid to contribute a portion of the phosphate to Resin A also serves to keep the pH of Resin A low (about 2). Further, if only monoammonium phosphate were used to provide all the phosphate, the shelf life of Resin A would be shortened due to premature gelling of the resin. Using a stepwise combination of monoammonium phosphate and phosphoric acid to contribute the orthophosphates to Resin A has been found to result in a much longer shelf life of Resin A.

The resulting composition known as Resin A is believed to consist substantially only of polymer molecules having various molecular weights. The molecules are probably both linear and branched with a polyol or polysaccharide backbone and various moieties of phosphate, urea, and glyoxal covalently bonded to the backbone via phosphoester and other linkages arising from condensation reactions. No significant amounts of free urea, ammonia, or phosphate are found in the resin, indicating that these compounds are covalently bonded to large molecular-weight entities in the solution. Yet, substantial numbers of reactive groups, in particular hydroxyl groups, are still present and available on the polymer molecules. This is known because, when Resin A and Resin B are mixed and heated to trigger a thermoset reaction, the reactants attack available hydroxyl groups in Resin A to effect the requisite crosslinking, as discussed in greater detail below.

Resin B

Resin B is a hydrophilic liquid solution having any one of several possible formulations. A first and preferred formulation is a methylol-melamine-formaldehyde resin. A second possible formulation is a methylol-urea-formaldehyde resin. A third possible formulation is a methylol-phenol-formaldehyde resin.

To prepare the first and preferred formulation of Resin B, about 22 w/w percent of melamine (1,3,5-triazine-2,4,6-triamine; CAS #108-78-1) is added at room temperature to about 45 w/w percent of a formalin solution (37% formaldehyde solution in water; CAS #50-00-0). The pH is adjusted to about 8.9 by adding concentrated NaOH solution (CAS #1310-73-2). The temperature is then increased to about 60° C. and held at that level while the mixture is slowly stirred.

Formaldehyde reacts with melamine to form methylol melamine:

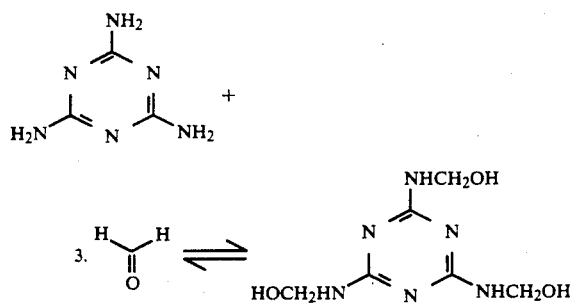

Polymerization of melamine and formaldehyde is inhibited by keeping the solution at an alkaline pH, by keeping the temperature and concentration of reactants somewhat low, and by the inclusion of methanol in the formalin solution (formalin solutions typically include about 15% methanol to inhibit polymerization of formaldehyde molecules).

About 33 w/w percent of methanol (CH₃OH, CAS #67-56-1) is subsequently added to the aqueous methylol melamine solution, where the methanol (including the methanol already present in the formalin solution) reacts with the methylol melamine to yield a substituted methylol melamine as follows:

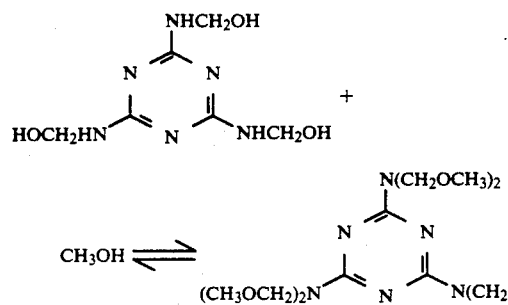

The product of the above reaction is soluble in water and stable in aqueous solution. The substituted methylol melamine serves as a crosslinking agent for the polymers in Resin A.

To prepare the second possible formulation of Resin B, about 18 w/w percent of urea, about 13 w/w percent of water, and about 6 w/w percent of methanol are added to about 55 w/w percent of a 50% aqueous solution of formaldehyde. The pH is adjusted to above 9 by adding concentrated NaOH solution. The resulting mixture is heated to about 80° C. for about 10 minutes. Then, the mixture is allowed to cool to about 38° C., at which time about 4 w/w percent of concentrated phosphoric acid (H₃PO₃; CAS #7664-38-2) is added. The resulting exothermic temperature rise is held at about 60° C. for a short period, then allowed to cool. Then, the pH is adjusted to neutral using concentrated NaOH to form the resin.

In this second formulation, urea reacts with formaldehyde via the formation of methylolureas, which react further with additional urea by dehydration:

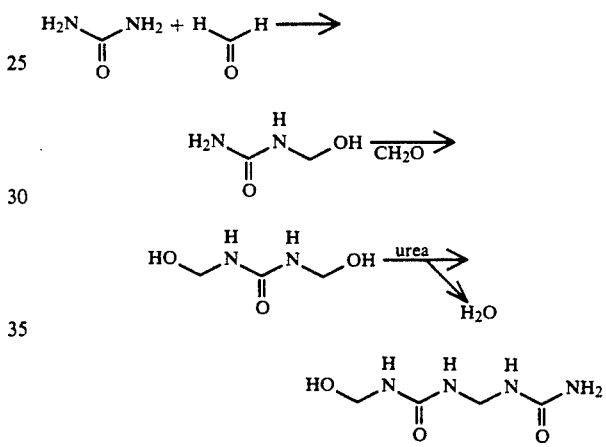

Methylolureas react with methanol in a manner similar to the reaction of methanol with methylol melamine as described above in connection with the first possible formulation. The modified urea serves as a crosslinking agent for the polymers in Resin A.

To prepare the third possible formulation of Resin B, about 50 w/w percent of phenol (CAS #108-95-2), about 1 w/w percent of lime (CaO; CAS #1305-78-8), and about 1.5 w/w percent of water are added to about 41 w/w percent of a 50% aqueous solution of formaldehyde. The temperature is increased to about 100° C. for about 1 hour, then cooled to about 70° C. About 2 w/w percent of hydrochloric acid (HCl; CAS #7647-01-0) and about 6 w/w percent of methanol are then added and the temperature maintained at 70° C. for about 30 minutes, after which the solution is allowed to cool.

In this third formulation, phenol and formaldehyde generally react via condensation reactions forming methylol intermediates:

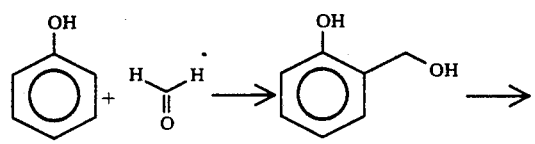

-continued

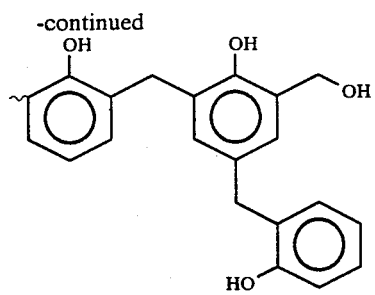

Under acidic conditions, the methylol intermediates are not isolatable. Under alkaline conditions, the above condensation reactions yield various compounds possessing ether bridges in addition to the —C—C— crosslinks. Methanol also contributes to the formation of heteroatom linkages in the polymer molecules. The resulting resin, termed generally a methylol-phenol resin, is stable at room temperature. The various methylol phenols having plural hydroxyls serve as crosslinking agents for the polymer compounds of Resin A.

Mixing Together Resins A and B to Form Resin C: Curing

Resin A and Resin B are mixed together generally in equal parts. Such mixture can be performed just before applying the mixture to various substrates. However, the preferred method is to mildly both alkylate and crosslink the mixture of Resin A and Resin B to form a Resin C. This is achieved by heating the mixture to about 50° C. for about 20 minutes. Resin C is stable as a liquid at room temperature. As a result, Resin C can be prepared long before use, which is preferred in the interest of conserving storage space and simplicity of use.

Because of its hydrophilicity, Resin C is compatible with hydrophilic substrates and can be readily applied thereto by various techniques such as brushing, spraying, or dipping. Preferably, Resin C is forced into pores and other interstices in the substrate during application by first subjecting the substrate to a partial vacuum, then applying Resin C, followed by application of pressure before curing.

To cure Resin C (i.e., form the thermoset), application of heat (about 50° C.) is required. The crosslinking reactions leading to formation of the thermoset occur mainly between available hydroxyl groups on the substituted polyols comprising Resin A and the crosslinking agent in Resin B. The crosslinking agent forms covalent "bridges" between hydroxyls either on the same polymer or on different polymers. Further, and very importantly, the crosslinking agent also reacts with available hydroxyl groups and other similarly reactive groups on the molecules comprising the hydrophilic substrate. For example, a hydrophilic substrate such as cellulose is comprised of glucose molecules predominantly linked end-to-end in a linear fashion. Each glucose contributes three hydroxyls to a cellulose molecule. Hence, a surface of a cellulosic material, such as wood, cellulose laminates, cellulose composites, paper, or cotton fabric, has a large number of hydroxyl groups available to react with the crosslinking agent in Resin B. As a result, the fire-retardant thermoset that is formed from Resin C becomes strongly covalently bonded to the hydrophilic substrate.

In the case where Resin B comprises a methylol-melamine-formaldehyde resin, the curing reaction results in the splitting off of methanol molecules from the substituted methylol melamine molecules. The liberated methanol diffuses out of the resulting network solid and into the atmosphere. After the curing reaction is complete, the resulting thermoset possesses substantial crystallinity (described in more detail in Example 4 below). Nevertheless, physical properties indicate that the thermoset material is indeed a network solid.

EXAMPLE 1

Resin A was prepared as follows:

| Reagent | Mass (g) | w/w % |
|---|---|---|
| Water | 366.0 | 15.11 |
| Maltodextrin | 278.0 | 11.48 |
| Ammonium Phosphate | 363.0 | 14.99 |
| Urea | 70.0 | 2.89 |
| Glyoxal 40% | 469.0 | 19.36 |
| Phosphoric Acid 75% | 876.0 | 36.17 |
| Total: | 2422.0 | 100.00 |

At room temperature, maltodextrin, ammonium phosphate and urea were added to the volume of water. Four drops of an antifoaming agent were added to the solution. The temperature was increased to 105° C. while refluxing the solution for 2.5 hours. At the end of the 2.5 hour period, the temperature was decreased to 50° C., at which time the glyoxal and phosphoric acid were added. The solution was held at 50° C. for 20 minutes before allowing it to cool to room temperature. The resulting Resin A had a viscosity of 49 cps and a pH of 0.36.

A methylol-urea-formaldehyde formulation of Resin B was prepared as follows:

| Reagent | Mass (g) | w/w % |
|---|---|---|
| Formaldehyde (50%) | 1339 | 55.28 |
| Methanol | 145 | 5.98 |
| Water | 325 | 13.40 |
| Urea | 446 | 18.4 |
| NaOH (50%) | 78 | 3.25 |
| $H_3PO_4$ (75%) | 89 | 3.69 |
| Total: | 2422.0 | 100.00 |

The formaldehyde solution, methanol, and urea were added to a reactor vessel. The pH of the resulting mixture was adjusted to 9.3 by addition of the NaOH solution. The mixture was heated to 80° C., held for 10 minutes at that temperature, then allowed to cool to 38° C. The phosphoric acid was added, initiating an exothermic reaction. The temperature increase of the mixture was arrested upon reaching 60° C., at which temperature the mixture was held for 10 minutes, then allowed to cool to 35° C. The pH was again adjusted using NaOH to 6.9 to 7.2. The resulting resin can be either stored separately or, preferably, mixed with Resin A and stored as a "Resin C1" until time for use.

EXAMPLE 2

Resin A was prepared as described in Example 1.
A methylol-phenol-formaldehyde formulation of Resin B was prepared as follows:

| Reagent | Mass (g) | w/w % |
|---|---|---|
| Phenol | 995 | 49.75 |
| Lime (CaO) | 15 | 0.75 |

-continued

| Reagent | Mass (g) | w/w % |
|---|---|---|
| Water | 28 | 1.41 |
| Formaldehyde (50%) | 813 | 40.63 |
| HCl | 33 | 1.66 |
| Methanol | 116 | 5.80 |
| Total: | 2000 | 100.00 |

The phenol, lime, water, and formaldehyde solution were added to a reactor vessel. The vessel was heated to a 100° C. reflux temperature and held thereat for 1 hour. The mixture was cooled to 70° C., after which the HCl and methanol were added. The temperature was held at 70° C. for 30 minutes, then cooled to 30° C. The resulting resin can be either stored separately or, preferably, mixed with Resin A and stored as a "Resin C2" until time for use.

EXAMPLE 3

Resin A was prepared as described in Example 1.

A methylol-melamine-formaldehyde formulation of Resin B was prepared as follows:

| Reagent | Mass (g) | w/w % |
|---|---|---|
| Formalin | 718.9 | 45.5 |
| Melamine | 342.0 | 21.5 |
| Methanol | 520.0 | 33.0 |
| Total: | 1580.0 | 100.0 |

The formalin (37% aqueous formaldehyde solution; about 15% methanol) was added to the melamine at room temperature. The pH of the solution was 2.22, which was adjusted to 8.86 by adding 29 g 15% NaOH solution. The methanol was then added and the temperature increased to 60° C., at which the temperature was held for 20 minutes, then allowed to cool to room temperature. The resulting resin can be either stored separately or, preferably, mixed with Resin A and stored as a "Resin C3" until time for use.

Resin C3 is prepared as follows:

| Reagent | Mass (g) | w/w % |
|---|---|---|
| Resin A | 2422 | 60.5 |
| Resin B | 1580 | 39.5 |
| Total: | 4002 | 100.0 |

After mixing Resin A and Resin B together, the resulting mixture was heated to 55° C. for 20 minutes, then cooled to room temperature. Resin C3 can be stored for months at room temperature in a liquid state.

EXAMPLE 4

Resin C3 was prepared as described in Example 3.

To form the fire-resistant thermoset, Resin C3 was cured in neat form by heating to 50° C. for 3 hours.

Various tests were performed on the thermoset to elucidate physical and chemical properties. First, it was noted that the thermoset was not soluble in any solvent, either aqueous or "organic," that would not react with the material. Various means of dissolution were tried, employing both pure and mixed polar and non-polar solvents at both room temperature and mildly elevated temperatures. No significant solvent loadings were detectable in any of the solvent systems tested, indicating that the cured material was a non-soluble thermoset material, rather than a thermoplastic.

A sample of the cured material was examined using an X-ray diffraction spectrometer. Strong 3.97 Å spacings were observed, along with weaker absorptions corresponding to spacings of lesser value. These results indicate that, in addition to being a thermoset, the cured material is appreciably crystalline. Therefore, the thermoset shares properties both of molecular crystals and of covalent crystals. The most likely structure consistent with these results is that any given "piece" of the cured material is a three-dimensional crosslinked network solid comprised of one giant "molecule" per piece, typical of thermoset materials.

The solubility experiments in various solvents, as described above, also revealed virtually no evidence of unpolymerized or partially polymerized substances in the cured material. No detectable low-molecular weight compounds leached out of the cured material. These results also indicate that the cured material would be substantially non-toxic, since nothing leaches therefrom.

EXAMPLE 5

Resin C3 was prepared as described in EXAMPLE 3.

Wood samples were prepared as described in ASTM Standard E160-80 (crib-test procedure). Briefly, samples of wood of a given species were randomly selected and randomly cut into pieces measuring ½-inch by ½-inch by 3 inches long. All surfaces were smooth-sawed to dimensions within ±1/32 inch. A quantity of 96 such pieces were prepared from western red cedar wood.

The entire quantity of wood pieces were placed in an autoclave with minimal physical contact between each piece. A subatmospheric pressure (20–27 mmHg) was applied to the interior of the autoclave for 30 minutes. The subatmospheric pressure opened pores and cavities having openings on the surface of the wood and expelled residual moisture from the pores and cavities, rendering the wood more capable of absorbing Resin C3.

At the end of the 30-minute period, Resin C3 was injected as a liquid into the autoclave interior so as to fully contact the exterior surfaces of each piece of wood therein. The pressure in the autoclave was then increased to 129–140 psig at ambient temperature for 20–30 minutes. Such application of pressure caused Resin C3 to penetrate deep into the pores, cavities, and other exposed interstices on the surfaces of the wood pieces. Penetration under pressure is particularly enhanced if the pores and cavities have been evacuated due to the prior application of subatmospheric pressure. The time period for pressurization can vary depending upon the desired fire classification of the treated wood. For a Class B-type wood roofing material, the time at pressure is about 30 minutes. For a class C-type wood roofing material, the time at pressure is about 20 minutes.

At the end of the specified time at pressure, the pressure in the autoclave was returned to atmospheric and the wood pieces were removed. Then, the temperature of the wood pieces was increased to about 50° C. to begin the thermoset reaction and held thereat to cure the Resin C3 applied to the wood.

After Resin C3 was cured, the treated wood pieces were subjected to a water-leach procedure, along with a parallel control comprised of similarly cut pieces similarly "treated" with a urea-dicyandiamide-phosphate fire-retardant formulation common in the art. In particular, each set of 96 wood pieces (96 control pieces) and 96 pieces treated with the composition of the present invention) were immersed in 5000 g water in a stainless steel container. A VMR type 1110 immersion heater/circulator was placed in each container and turned on. The heater/circulators were adjusted to heat the water in each container to 50° C. After 20 minutes at 50° C., 24 pieces of wood were removed from each container and dried. The temperature in each container was then increased to 60° C. After 20 minutes at 60° C., 24 pieces of wood were removed from each container and dried. The temperature in each container was then increased to 70° C. After 20 minutes at 70° C., 24 pieces of wood were removed from each container and dried. The temperature in each container was then increased to 80° C. After 20 minutes at 80° C., the remaining 24 pieces of wood were removed from each container and dried.

Each set of 24 pieces of wood removed from the water, as described above, was independently burned, according to ASTM Standard E160-80, to determine the "burn loss," or loss of weight after a standard burn. The less the "burn loss," the better the fire retardancy. In brief, each set of 24 pieces was separately stacked in a criss-cross pattern in an individual wire frame to form a "crib." The crib was weighed to at least 0.1 g. A calibrated Meker burner was centered beneath the crib to heat the wood pieces to ignition temperature. The burner flame was applied for 3 minutes, after which the burner was removed from beneath the crib. After all flaming and glowing had ceased, the crib was weighed again. Final weights were subtracted from original weights and the losses in mass due to heating were expressed as a percentage of the original weights. Results are shown in Table 1.

TABLE 1

| Col. 1 Soak Temp | Col. 2 Burn Loss (Control) | Col. 3 Burn Loss (Resin C3) | Col. 4 Differential (Col. 2–Col. 3) | Col. 5 Ratio (Col. 4/Col. 3) | Col. 6 Differential (Col. 2–Col. 5) |
|---|---|---|---|---|---|
| 50° C. | 46.7% | 33.5% | 13.2% | 31.8% | 14.9% |
| 60° C. | 39.6% | 26.7% | 12.9% | 26.1% | 13.5% |
| 70° C. | 39.6% | 27.6% | 12.0% | 26.6% | 13.0% |
| 80° C. | 39.0% | 27.4% | 11.6% | 23.3% | 15.7% |

As can be seen from the Table 1 results, the fire retardant of the present invention confers an approximately 14% improvement in fire retardancy over a urea-dicyandiamide fire retardant common in the art. Key differences between the control urea-dicyandiamide-phosphate formulation and the formulation of Resin C3 include: the control formulation lacks a polyol, such as starch; the control formulation covalently bonds weakly at best to a cellulosic or similar hydrophilic substrate; and the phosphate and urea ingredients are not as covalently bound to the polymer matrix, as in the present invention.

Therefore, the fire-retardant formulation of the present invention confers improved fire retardancy over a common urea-dicyandiamide-phosphate fire retardant common in the art.

Although the evacuation-pressurization procedure for treating wood, as described above, is the preferred process for treating wood for fire retardancy using the formulation of the present invention, surficial application without the evacuation-pressurization procedure will suffice for many purposes, especially where long-term resistance to harsh weather is not required. For example, the evacuation-pressurization procedure is particularly beneficial when employed for treating exterior wooden shakes and shingles. This is because the evacuation-pressurization procedure forces the formulation deep within wood pores and cavities, conferring fire retardancy over the useful life of the wooden shakes and shingles.

Wood use for interior applications, such as finish work, cabinetry, and the like, need not be subjected to the evacuation-pressurization treatment, using the formulation of the present invention, to confer adequate fire retardancy. Instead, any of the Resin C formulations can be applied to the wood by brushing, dipping, or spraying, followed by curing. Because of the acid pH and hydrophilicity while still liquid, the Resin C formulations penetrate into the hydrophilic wood substrate, even without evacuation and pressurization. After curing, treated wood surfaces may be painted.

Having described the principles of our invention with reference to several embodiments and plural examples, it should be apparent to those of ordinary skill in the art that the invention may be modified in arrangement and detail without departing from such principles. We claim as our invention all such modifications as come within the true spirit and scope of the following claims.

We claim:

1. A flame-retardant material comprising:
   (a) a thermoset network of polymer molecules covalently interlinked together and having multiple oxygen atoms covalently bonded thereto;
   (b) substituent groups comprising nitrogen- and phosphorus-containing groups as well as glyoxal groups covalently bonded to a first population of the oxygen atoms; and
   (c) crosslinking groups covalently bonded to a second population of the oxygen atoms and to the substituent groups on the polymer molecules.

2. A flame retardant material as recited in claim 1 wherein the nitrogen- and phosphorus-containing groups are non-leachable from the material when the material is exposed to water.

3. A flame-retardant material as recited in claim 1 that is intumescent when exposed to a flame.

4. A flame-retardant material as recited in claim 1 wherein the polymer molecules are selected from the group consisting of maltodextrin, polyvinyl alcohol, and starches.

5. A flame-retardant material as recited in claim 1 wherein the nitrogen-containing substituent groups are derived from reaction of the polymer molecules with monoammonium phosphate and urea.

6. A flame-retardant material as recited in claim 1 wherein the phosphorus-containing substituent groups are derived from reaction of the polymer molecules with monoammonium phosphate and phosphoric acid.

7. A flame-retardant material as recited in claim 1 wherein the crosslinking groups are derived from a reaction of formaldehyde and methanol with a reagent selected from the group consisting of melamine, urea, and phenol.

8. A flame-retardant composition for applying to a combustible hydrophilic substrate for the purpose of rendering the substrate resistant to combustion, the composition comprising a thermosettable liquid mixture of a first resin and a second resin, wherein (a) the first resin is comprised of a hydrophilic solution of polymer molecules each having multiple oxygen atoms covalently bonded thereto, a first population of the oxygen atoms having substituent groups covalently bonded thereto as a result of reactions of monoammonium phosphate, urea, phosphoric acid, and glyoxal with the polymer molecules, and a second population of the oxygen atoms being in the form of hydroxyl groups; and (b) the second resin is comprised of a hydrophilic solution of at least one crosslinking agent reactive under curing conditions with the substituent groups and the hydroxyl groups of the first resin, and with molecules comprising a hydrophilic substrate so as to covalently crosslink the polymer molecules of the first resin with each other and with the hydrophilic substrate to form a thermoset when the flame-retardant composition is applied to the substrate and cured.

9. A flame-retardant composition as recited in claim 8 wherein the polymer molecules in the first resin are selected from the group consisting of molecules of maltodextrin, polyvinyl alcohol, and starches.

10. A flame-retardant composition as recited in claim 8 wherein the phosphate, urea, and ammonium are nonleachable from the composition after the composition has cured.

11. A flame-retardant composition as recited in claim 8 wherein the second resin is a methylol-melamine-formaldehyde resin.

12. A flame-retardant composition as recited in claim 11 that is at least partially crystalline after curing.

13. A flame-retardant composition as recited in claim 8 wherein the second resin is a methylol-urea-formaldehyde resin.

14. A flame-retardant composition as recited in claim 8 wherein the second resin is a methylol-phenol-formaldehyde resin.

15. A flame-retardant composition as recited in claim 8 wherein the liquid mixture of the first and second resins has an acidic pH.

16. A flame-retardant composition as recited in claim 8 wherein the crosslinking agent covalently bonds to hydroxyl groups on hydrophilic molecules comprising the substrate when the composition is applied to the substrate and cured.

17. A flame-retardant composition as recited in claim 8 for application to cellulosic substrates.

18. A flame-retardant composition as recited in claim 8 that is heat-curable.

19. A flame-retardant composition as recited in claim 8 wherein the first and second resins are separately storable in a liquid state.

20. A flame-retardant composition as recited in claim 8 wherein the mixture of the first and second resins is storable in a liquid state.

21. A flame-retardant material as recited in claim 7 wherein the nitrogen containing substituent groups are derived from reaction of the polymer molecules with monoammonium phosphate and urea.

* * * * *